US009497252B2

(12) United States Patent
Harter

(10) Patent No.: US 9,497,252 B2
(45) Date of Patent: Nov. 15, 2016

(54) ON-DEMAND CODE VERSION SWITCHING

(71) Applicant: International Business Machines Corporation, Armonk, NY (US)

(72) Inventor: John L. Harter, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 14/230,088

(22) Filed: Mar. 31, 2014

(65) Prior Publication Data

US 2015/0281400 A1 Oct. 1, 2015

(51) Int. Cl.
*G06F 15/16* (2006.01)
*H04L 29/08* (2006.01)
*H04L 29/06* (2006.01)
*G06F 17/21* (2006.01)

(52) U.S. Cl.
CPC ............ *H04L 67/02* (2013.01); *G06F 17/212* (2013.01); *H04L 67/2823* (2013.01); *H04L 67/42* (2013.01)

(58) Field of Classification Search
CPC .............................. H04L 67/42; H04L 67/02
USPC ........................................................ 709/203
See application file for complete search history.

(56) References Cited

U.S. PATENT DOCUMENTS

| | | | |
|---|---|---|---|
| 6,668,325 B1 | 12/2003 | Collberg et al. | |
| 8,655,943 B2* | 2/2014 | Gill ............................. | 709/203 |
| 2008/0235325 A1* | 9/2008 | Calvert ............. | G06F 17/30902 709/203 |
| 2009/0070413 A1* | 3/2009 | Priyadarshan ...... | G06F 17/2247 709/203 |
| 2010/0123908 A1* | 5/2010 | Denoue ................ | G06F 17/212 358/1.6 |
| 2011/0295936 A1* | 12/2011 | Gill .................... | G06F 17/30873 709/203 |
| 2012/0240033 A1* | 9/2012 | Soni ........................ | G06T 11/60 715/235 |
| 2013/0104060 A1* | 4/2013 | Chandra ........... | G06F 17/30899 715/760 |
| 2013/0283396 A1 | 10/2013 | Langer et al. | |
| 2014/0047322 A1* | 2/2014 | Kim ..................... | G06F 17/2247 715/234 |
| 2015/0096006 A1* | 4/2015 | Chu ....................... | G06F 21/128 726/9 |
| 2015/0134629 A1* | 5/2015 | Knobloch ........... | G06F 17/2288 707/695 |

OTHER PUBLICATIONS

Grace Period Disclosure "IBM Security Identity Manager, ver 6.0, Fiixpack 6.0.0.2-IISS-SIIM-FP0002", http://www-01.ibm.com/support/docview.wss?uid=swg24036527, pp. 1-6, Accessed on Mar. 28, 2014.
Grace Period Disclosure "Troubleshooting Guide", IBM Security Identity Manager Version 6.0, Available at http://publib.boulder.ibm.com/infocenter/tivihelp/v2r1/index.jsp?topic=%2Fcom.ibm.isim.doc_6.0%2Fic-homepage.htm, pp. 29-31.
Grace Period Disclosure "IBM Security Identity Manager", http://www-03.ibm.com/software/products/en/identity-manager, pp. 1-2, Accessed on Mar. 28, 2014.

* cited by examiner

*Primary Examiner* — Richard G Keehn
(74) *Attorney, Agent, or Firm* — Kamyar Maserrat; Edward Choi

(57) ABSTRACT

Receiving, by a first computer, a request from a second computer for a web page that contains embedded code. The first computer includes a plurality of versions of the embedded code. In response to determining, by the first computer, that the web page request includes a request for a specific version of the embedded code, the first computer modifies a default version of the web page to embed the requested specific code version and transmits the modified web page to the second computer. In another aspect, in response to determining, by the first computer, that the web page request does not include a request for a specific version of the embedded code, transmitting, by the first computer, the default version of the web page that contains a default version of the embedded code to the second computer.

17 Claims, 3 Drawing Sheets

ON-DEMAND CODE VERSION SWITCHING

STATEMENT REGARDING PRIOR DISCLOSURES BY THE INVENTORS OR A JOINT INVENTOR

Aspects of the present invention have been disclosed by the Applicant, who obtained the subject matter disclosed directly from the inventors, in the product IBM Security Identity Manager 6.0 Fixpack 6.0.0.2-ISS-SIM-FP0002, made available to the public on Nov. 22, 2013.

BACKGROUND

The present disclosure relates generally to software management and more particularly to enabling web applications with on-demand code version switching.

Web applications may be considered client-server software where a portion of the web application code executes on a server (server-side application) and a portion of the web application code executes on a client (client-side application). Machines on the Web may be categorized as two types: servers and clients. A server machine may provide one or more services on the Web. A client machine may use the services provided by the server machine. For example, a server machine might execute software that allows it to act as a web server, an e-mail server, and a file transfer protocol (FTP) server. A client machine may connect to the Web or execute an application from the Web. For example, the client machine may view web pages, check e-mail, or retrieve files from the server machine. Client machines, hereinafter "client", may download client-side application software, from the server machine, using standard procedures such as Hypertext Transfer Protocol (HTTP), when the client visits a web page.

Client-side applications are web application software that execute in a client web browser and may be written in a browser-supported programming language such as JavaScript, HyperText Markup Language (HTML), and Cascading Style Sheets (CSS), and rely on a common web browser to render the application. Client-side applications may change content depending on client input and environmental conditions, such as the time of day.

Client-side application code may be hosted on the server machine and delivered to the client either embedded in the HTML of a delivered web page or as separate, linked downloads specified in the HTML. A web application can be as simple as a message board on a website, or as complex as a word processor.

Clients may execute client-side applications that interface with the server machine and may direct requests to specific server software on the server machine. The client-side applications typically focus on the presentation of information while the servers typically focus on storing and retrieving information.

SUMMARY

Embodiments of the present disclosure disclose a method, computer program product, and system for receiving, by a first computer, a request from a second computer for a web page that contains embedded code. The first computer includes a plurality of versions of the embedded code. In response to determining, by the first computer, that the web page request includes a request for a specific version of the embedded code, the first computer modifies a default version of the web page to embed the requested specific code version and transmits the modified web page to the second computer.

In another aspect, in response to determining, by the first computer, that the web page request does not include a request for a specific version of the embedded code, transmitting, by the first computer, the default version of the web page that contains a default version of the embedded code to the second computer.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
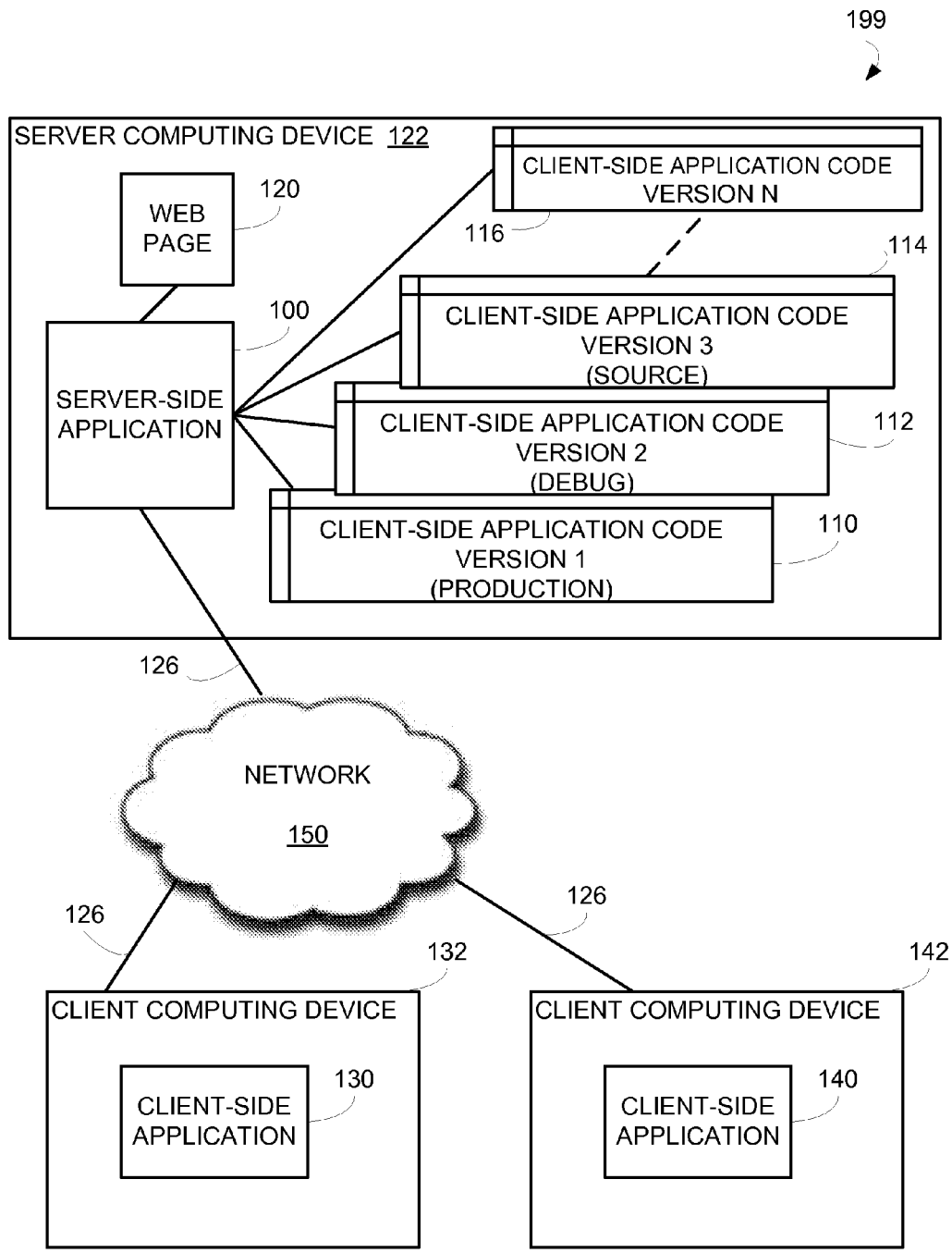
FIG. 1 illustrates a functional block diagram of a client-server environment, in accordance with an embodiment of the disclosure.

Web application software that executes in a client browser may be hosted on a server machine, or server, and delivered to the client with a web page. The web application software that executes in a client browser environment, hereinafter "client-side application," is typically written in a language such as JavaScript and is typically transmitted, or downloaded, to the client as source code. The source code may be interpreted, in the client browser, without compilation or assembly, and may be easily human readable. A large client-side application may be slow to download, due to size, and may create an unsatisfactory client experience. In addition to download speed, memory utilization, performance, and serviceability may be considered part of the client experience. For example, the most effective way to service a client-side application may be to interactively debug the source code in the client browser. This may improve serviceability, but may expose the intellectual property of the client-side application. Providing the full source of the client-side application code, rather than obfuscated and performance optimized code for serviceability, may also impact the application's download performance, execution performance, and memory utilization due to the size of the application.

Protecting the intellectual property of a client-side application by obfuscating the code may protect the code from illegal copying and reuse, but may hinder the application's serviceability. Adding logging and tracing to the client-side application, to collect data, may improve problem determination, but may impact application performance by increasing the size of the delivered application, which in turn, may increase the download time of the application, and the memory utilized by the application in the client browser.

Collecting the problem determination data may also impact the execution performance of the application.

Since optimized performance and obfuscated code is typically the goal for a production version of a client-side application, serviceability may typically be handled either by putting the server-side of the application into a "debug mode" when the application needs to be serviced, or by enabling a serviceability feature in the client-side application to collect log and trace data. Putting the server-side of the application into "debug mode" may enable the server to download serviceable code (either full source code or code with log/trace activated).

Putting a server-side application into "debug mode", to download an alternate, serviceable version of the client-side application, may require a restart of the application. Restarting may allow the server-side application to switch the client-side application code hosted from the production version to a serviceability version. The server-side application may be unavailable during the restart and may impact all clients that, after the restart, download the larger, slower, serviceable version of the client-side application.

Alternately, including problem determination data collection, as a serviceability feature in the production version of the client-side application, may require log and trace statements to be included. As stated above, adding log and trace statements in the production version of the client-side application may increase the application size, application download time, and browser memory utilization for all clients, even when problem determination data collection is not executing.

Embodiments of this disclosure describe a server machine simultaneously hosting multiple versions of a client-side application. Individual clients may execute any of the hosted versions and may switch between the versions "on-demand." Switching to a different version of a client-side application may, in certain embodiments, include a download of the requested version from the server machine to the requesting client browser, without affecting other clients. Exemplary versions of a client-side application that may be hosted simultaneously on a server machine may include a production version that is optimized for size and performance and obfuscated for intellectual property protection; a debug version that may also be obfuscated for protection, but may include an abundance of log and trace statements for problem determination data collection, at the cost of performance; and a non-optimized and non-obfuscated source version that may be delivered to customers only when required to enable full interactive debugging. Hosting multiple versions of the client-side application code simultaneously on the server machine may advantageously allow one or more clients to select, for example, to execute a debug version of the application while the remaining clients continue to receive and execute the production version of the application. A typical application, hosting a single version of client-side application code, may need to restart with a different version of the client-side application code to switch versions. Hosting multiple versions of the client-side application code simultaneously, may allow the server machine to download varying versions to the clients without a restart. Hosting multiple versions of the client-side application code also allows a client to execute a debug version of the client-side application code without impacting the performance of other clients, and without requiring that other clients also execute the debug version of the application. Other embodiments may include the server machine hosting an upgraded version of the client-side application used for testing new functionality and performance on one client while all other clients continue to receive and execute a production version of the client-side application.

Exemplary embodiments of the disclosure are described using a server-side application associated with client-side applications executing in a client browser. Those of skill in the art will appreciate that other embodiments of the invention may be used to advantage for numerous other servers and clients such as web servers with HTML pages, and e-mail servers with e-mail clients.

Figure 3:
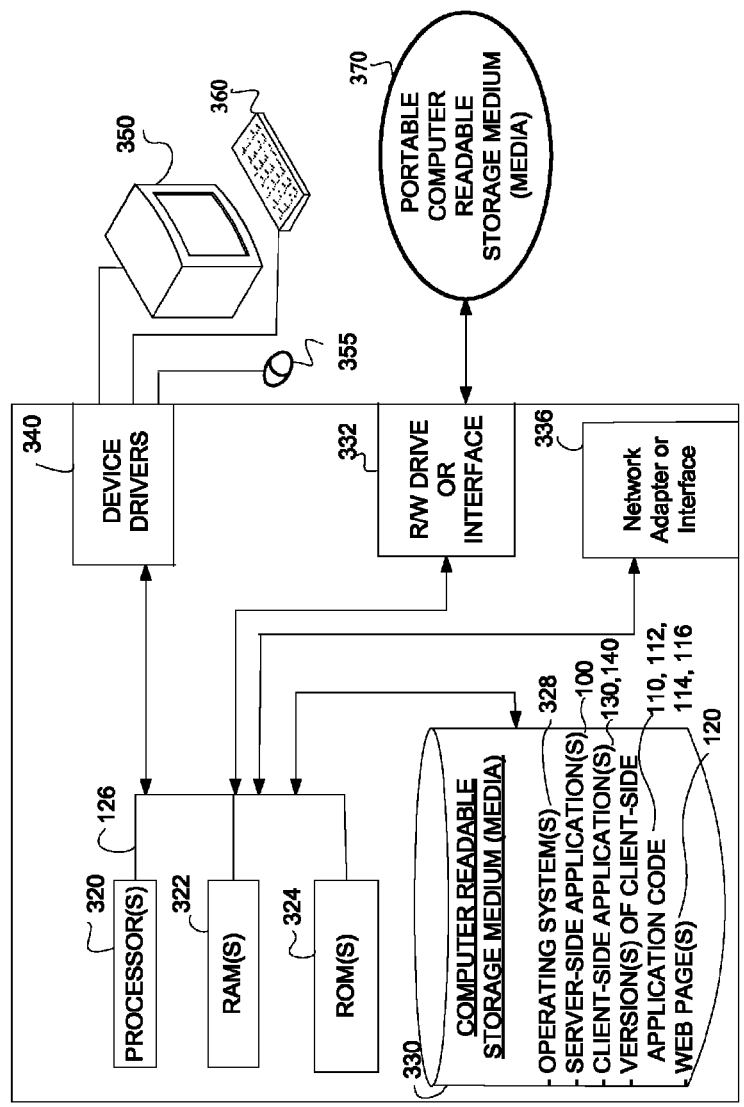
FIG. 3 depicts a block diagram of components of the server and client computing devices of a client-server environment, in accordance with an embodiment of the disclosure.

FIG. 1 illustrates a functional block diagram of an exemplary client-server environment 199, in accordance with an embodiment of the disclosure. Client-server environment 199 includes a server computing device 122 and one or more client computing devices 132, 142. Server computing device 122 includes one or more server-side applications 100, storage for one or more downloadable web pages 120, and one or more versions of client-side application code 110, 112, 114, 116 associated with server-side application 100, all of which may be stored, for example, on a computer readable storage medium, such as computer readable storage medium (media) 330 (FIG. 3) or portable computer readable storage medium (media) 370 (FIG. 3).

In various embodiments, the plurality of versions 110, 112, 114, 116 of client-side application code may be created using standard build tools such as Dojo Build. The plurality of created versions 110, 112, 114, 116 of the client-side application code may be included on the application install image, and installed on the server computing device 122 along with the server-side application 100. Certain embodiments may not include a source version 114 of the client-side application code on the application install image in order to protect the intellectual property exposed in the source code. The source code may be delivered to the server computing device 122 by the application support team, enabling a client computing device 132, 142, hereinafter "client", to request that source version 114 of the client-side application code when interactive debugging may be needed for error determination.

Exemplary versions 110, 112, 114, 116 of the client-side application code may include a production version 110, optimized and obfuscated, with all unnecessary code, such as log/trace statements, removed. The production version 110 may be the smallest and fastest version of the client-side application and the default version used by clients 132, 142. Exemplary versions 110, 112, 114, 116 of the client-side application code may also include a debug version 112, optimized and obfuscated, but with the log and trace statements left intact. The resulting debug version 112 may be larger and less efficient than the production version 110 of the client-side application code. The log and trace statements in the debug version 112 may allow the client-side application 130, 140, executing on the client 132, 142, to generate and collect execution-time problem determination data. A source code version 114 may be another exemplary version 110, 112, 114, 116 of the client-side application code. The source version 114 may be neither optimized nor obfuscated, and may include log and trace statements. The source version 114 of the client-side application code may match the code stored in the application developer's code library/control system. The source version 114 of the client-side application code may enable support personnel to debug problems on a client 132, 142 using code versions that match those maintained in the application developer's library/control system.

In various embodiments, web page 120 may include HTML code that is downloaded to the client computing devices 132, 142. Web page 120 may include a version 110, 112, 114, 116 of the client-side application code. In certain embodiments, the client-side application code 110, 112 114, 116 may be embedded in the web page 120. In other embodiments, the web page 120 may include one or more links to the client-side application code 110, 112, 114, 116. The web page 120 may be downloaded to client 132, 142 over network 150.

In various embodiments server-side application 100 may receive requests for the application's web page 120, from client 132, 142, may ensure the web page 120 includes the appropriate version of the client-side application code 110, 112, 114, 116 requested by the client 132, 142, and may download the web page 120 to the client 132, 142.

Server computing device 122 may additionally include communications fabric 126 to communicate with client 132, 142 over network 150.

Client computing devices 132, 142 include one or more client-side applications 130, 140. Client application 130, 140 may be the web application software downloaded with web page 120 from server computing device 122 and rendered by the client 132, 142 browser. The web page 120 may embed or include links to the client-side application code. The web page 120 download may occur when the client 132, 142 browser addresses the server-side application 100. In certain embodiments, placing a uniform resource locator (URL) into a web browser address bar may point the client 132, 142 browser to the server-side application 100. In other embodiments, a menu selection item or a widget may point the client 132, 142 browser to the server-side application 100.

The client-side application 130, 140 may be stored, for example, on a computer readable storage medium, such as computer readable storage medium (media) 330 (FIG. 3) or portable computer readable storage medium (media) 370 (FIG. 3).

Client computing devices 132, 142 may include communications fabric 126 to communicate with server computing device 122.

The network 150 may include the Internet, a local area network or other, wide area network or wireless network. The network 150 and communication fabric 126 may be implemented with any architecture designed for passing data and/or control information between processors (such as microprocessors, communications and network processors, etc.), system memory, peripheral devices, and any other hardware components within a system and may comprise copper wires, optical fibers, wireless transmission, routers, firewalls, switches, gateway computers, and/or edge servers.

Server computing device 122 and client computing devices 132, 142 represent computing devices, systems or environments, and may be laptop computers, notebook computers, personal computers (PC), desktop computers, tablet computers, thin clients, mobile phones or any other electronic devices or computing systems capable of performing the required functionality of embodiments of the disclosure. Server computing device 122 and client computing devices 132, 142 may include internal and external hardware components, as depicted and described in further detail with respect to FIG. 3. In other various embodiments of the present disclosure, server computing device 122 and client computing devices 132, 142 may represent a computing system utilizing clustered computers and components to act as a single pool of seamless resources. In general, server computing device 122 and client computing devices 132, 142 are representative of any programmable electronic device or combination of programmable electronic devices capable of executing machine-readable program instructions in accordance with an embodiment of the disclosure.

Server-side application 100 may be any application executing on a server computing device 122 that downloads programs to a client 132, 142. Exemplary server-side applications 100 may include web servers, information servers, and e-mail servers. For purposes of illustration, server-side application 100 may, in various embodiments, provide a web hosting application that delivers client-side application code that executes in a client 132, 142 web browser. The server-side application 100 may include a plurality of versions 110, 112, 114, 116 of the client-side application code and download a particular version 110, 112, 114, 116 of the client-side application code, over network 150, upon request, to the requesting client 132, 142. The requested, version 110, 112, 114, 116 of the client-side application code may be downloaded to the client's 132, 142 browser in web page 120. In various embodiments, server-side application 100 may provide a default version 110, 112, 114, 116 of the client-side application code when the client 132, 142 does not request a specific version 110, 112, 114, 116 of the client-side application code.

Figure 2:
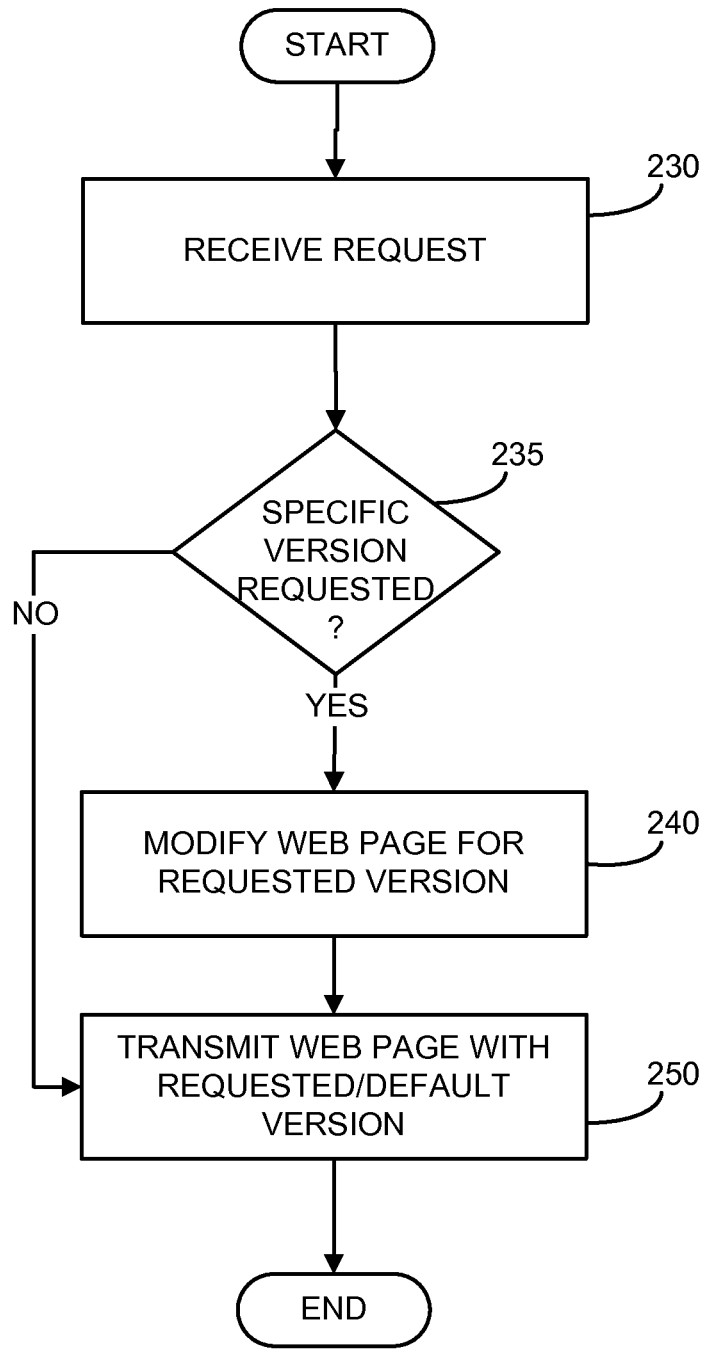
FIG. 2 is a flowchart illustrating the operation of a server-side application, in accordance with an embodiment of the disclosure.

FIG. 2 is a flowchart illustrating the operation of server-side application 100, in accordance with an embodiment of the disclosure. In various embodiments, server-side application 100 may include the plurality of installed versions 110, 112, 114, 116 of the client-side application code. The versions 110, 112, 114, 116 of the client-side code may be installed on server computing device 122 along with the server-side application 100. In certain embodiments, each installed version 110, 112, 114, 116 of the client-side application code may be stored in a separate path, or folder, on the server computing device 122. Including the plurality of versions 110, 112, 114, 116 of the client-side application code allows server-side application 100 to select any one of the plurality of versions 110, 112, 114, 116 to download to the client 132, 142. Each client 132, 142, may request a version 110, 112, 114, 116 of the client-side application code, from the same server-side application 100, regardless of version 110, 112, 114, 116 of the client-side application code requested by other clients 132, 142.

Server-side application 100 may, at 230, receive a request from a client 132, 142 for a version 110, 112, 114, 116 of the client-side application code. In various embodiments, server-side application 100 may receive the request as a URL. The request may be initiated when a client 132, 142, for example, enters a URL into a web browser address bar. In certain embodiments, a client 132, 142 may select a menu item, select a widget, or refresh a page to initiate a request.

In various embodiments, server-side application 100 may include scripts, such as JAVA Server Pages (JSP), Active Server Pages (ASPs), and Java servlets that modify the content of web page 120. In certain embodiments, a default web page 120 may embed or link to the production version 110 of the client-side application code. By defaulting to the production version 110 of the client-side application code, server-side application 100 may deliver, by default, the optimized and obfuscated version.

If a specific version 110, 112, 114, 116 of the client-side application code is requested, as determined at 235, server-side application's 100 scripts may modify the HTML in the web page 120, at 240, to embed or link to the requested version 110, 112, 114, 116 of the client-side application code before the web page 120 is downloaded to a client 132, 142 browser.

If a specific version 110, 112, 114, 116 of the client-side application code was not requested, as determined at 235, server-side application 100 may embed or link to a default version 110, 112, 114, 116 of the client-side application code. In certain embodiments, the web page 120 may include a default version 110, 112, 114, 116 of the client-side application code and may not need to be modified.

In certain embodiments, server-side application 100 scripts may also retrieve up-to-date data to be delivered to a client 132, 142.

An exemplary URL to the server-side application 100 may look as follows, where exemplary server-side application 100 script, "application.jsp" may modify the web page 120:

http://host:port/url/path/application.jsp

In various embodiments, server-side application 100 may receive a URL with key=value query parameters identifying which version 110, 112, 114, 116 of the client-side application code is requested. Server-side application's 100 scripts may utilize the URL query parameters to modify the web page 120 such that the HTML embeds or links to the version 110, 112, 114, 116 of the client-side application code requested by the query parameters received from client 132, 142. In certain embodiments, the URL may specify the path to the requested version rather than query parameters.

In an exemplary embodiment, a single client 132, 142 may encounter problems with an application and request a debug version 112 of the client-side application code. The single client 132, 142 may enter the following URL into the web browser address bar:

http://host:port/url/path/
application.jsp?versionPath=debug

Server-side application's 100 scripts may use the exemplary key=value pair, "versionPath=debug", to modify the web page 120 for this request such that the HTML embeds or links to the debug version 112 of the client-side application code instead of the production version 110. The key=value pair may be used to specify any version 110, 112, 114, 116 of the client-side application code installed with the server-side application 100.

After the server-side application 100 has modified the web page 120 to embed or link to the requested version or default version 110, 112, 114, 115 of the client-side application code, the server-side application 100 may, at 250, transmit the web page 120 to the client 132, 142, over network 150, to be downloaded into the client's 132, 142 browser. The client's 132, 142 browser may render the web page 120 and the client may execute the client-side application 130, 140 with the requested version 110, 112, 114, 116 of the client-side application code.

In various embodiments, server-side application 100 may also modify the web page 120 to set a browser session cookie, in the requesting client's 132, 142 browser to "remember" the version 110, 112, 114, 116 of the client-side application code requested. In certain embodiments this cookie may include the URL query parameter value. Remembering which version 110, 112, 114, 116 of the client-side application code to download, whenever the browser is refreshed, may allow the correct version 110, 112, 114, 116 of the client-side application code to be delivered by the server-side application 100 without conflicting with other URL query parameters supported by the server-side application 100. In the exemplary debug example above, logging and tracing may be enabled to support problem determination each time the client 132, 142 browser is refreshed, even if the client 132, 142 adds additional execution or display query parameters on the URL.

In various embodiments, the client computing device 132, 142 may revert back to the production version 110 of the client-side application code by specifying a query parameter that indicates the production version 110 is requested or by, for example setting the value of the key=value query parameter to a null or blank character, such as "versionPath=". Various embodiments may remove the browser cookie when the production version 110 is requested. Certain embodiments may remove the cookie when the browser is closed.

In various embodiments, server-side application 100 may receive query parameters on the URL that affect the execution of the client-side application 130, 140 in the client 132, 142 browser, in addition to query parameters that affect the version selection. These query parameter values, may also set a browser cookie.

In an exemplary embodiment, server-side application 100 may receive serviceability query parameters that affect the execution of the client-side application 130, 140, in the client 132, 142. For example, a debug 112 version of the client-side application code may be requested with serviceability query parameters specifying which logs and traces should be enabled in the debug version 112 of the client-side application code. For example, the following URL requests the debug version 112 of the client-side application code with "versionPath=debug", but also includes an additional exemplary query parameter "traceCode=" where exemplary values for traceCode=may include "codeA"—to log all available trace records, "codeB"—to log only trace records of severity INFO and higher and "codeC"—to log only trace records of severity ERROR and higher:

http://host:port/url/path/
application.jsp?versionPath=debug&traceCode=
codeA:all,codeB:info,codeC:error Server-side application 100 may receive these complex queries on the URL and modify the web page 120 to not only link to the requested version 110, 112, 114, 116 of the client-side application code, but to also indicate that the specified "traceCode=" value (codeA, codeB, codeC) be enabled for the requested level of logging of trace records.

FIG. 3 depicts a block diagram of components of a server computing device 122 and client computing devices 132, 142 devices of the client-server environment 199 of FIG. 1, in accordance with an embodiment of the disclosure. It should be appreciated that FIG. 3 provides only an illustration of one implementation and does not imply any limitations with regard to the environments in which different embodiments may be implemented. Many modifications to the depicted environment may be made.

Server computing device 122 and client computing device 132, 142 can include one or more processors 320, one or more computer-readable RAMs 322, one or more computer-readable ROMs 324, one or more computer readable storage medium 330, device drivers 340, read/write drive or interface 332, and network adapter or interface 336, all interconnected over a communications fabric 126. Communications fabric 126 can be implemented with any architecture designed for passing data and/or control information between processors (such as microprocessors, communications and network processors, etc.), system memory, peripheral devices, and any other hardware components within a system.

One or more operating systems 328, server-side applications 100, client-side applications 130, 140, web pages 120 and versions 110, 112, 114, 116 of client-side application code are stored on one or more of the computer-readable storage medium 330 for execution by one or more of the processors 320 via one or more of the respective RAMs 322 (which typically include cache memory). In the illustrated embodiment, each of the computer readable storage medium 330 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer readable storage medium that can store a computer program and digital information.

Server computing device 122 and client computing device 132, 142 can also include a R/W drive or interface 332 to read from and write to one or more portable computer readable storage medium 370. Server-side application 100, client-side application 130, 140, web pages 120, and versions 110, 112, 114, 116 of client-side application code on server computing device 122 and client computing device 132, 142 can be stored on one or more of the portable computer readable storage medium 370, read via the respective R/W drive or interface 332, and loaded into the respective computer readable storage medium 330.

Server computing device 122 and client computing device 132, 142 can also include a network adapter or interface 336, such as a TCP/IP adapter card or wireless communication adapter (such as a 4G wireless communication adapter using OFDMA technology). Server-side application 100, client-side application 130, 140, web pages 120, and versions 110, 112, 114, 116 of client-side application code on server computing device 122 and client computing device 132, 142 can be downloaded to the computing device from an external computer or external storage device via a network (for example, the Internet, a local area network or other, wide area network or wireless network) and network adapter or interface 336. From the network adapter or interface 336, the programs are loaded into the computer readable storage medium 330. The network may comprise copper wires, optical fibers, wireless transmission, routers, firewalls, switches, gateway computers, and/or edge servers.

Server computing device 122 and client computing device 132, 142 can also include a display screen 350, a keyboard or keypad 360, and a computer mouse or touchpad 355. Device drivers 340 interface to display screen 350 for imaging, to keyboard or keypad 360, to computer mouse or touchpad 355, and/or to display screen 350 for pressure sensing of alphanumeric character entry and user selections. The device drivers 340, R/W drive or interface 332, and network adapter or interface 336 can comprise hardware and software (stored in computer readable storage medium 330 and/or ROM 324.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method comprising:
    receiving, by a first computer, a request from a second computer for a web page that contains embedded code, wherein the first computer includes a plurality of versions of the embedded code;
    in response to determining, by the first computer, that the web page request includes a request for a specific version of the embedded code:
    modifying, by the first computer, a first default version of the web page, to include a version of the embedded code of the plurality of versions of the embedded code that matches the requested specific version of the embedded code, wherein the first default version of the web page includes a link to the version of the embedded code of the plurality of versions of the embedded code that matches the requested specific version of the embedded code; and
    transmitting, by the first computer, the modified first default version of the web page to the second computer.

2. The method according to claim 1, further comprising:
    in response to determining, by the first computer, that the web page request does not include a request for a specific version of the embedded code,
    transmitting, by the first computer, a default version of the web page that contains a default version of the embedded code to the second computer.

3. The method according to claim 1, wherein the plurality of versions of the embedded code comprise at least one of:
    a production version,
    a debug version, and
    a source version.

4. The method according to claim 1, wherein the request received is a uniform resource locator (URL).

5. The method according to claim 4, wherein the URL includes a query parameter to identify the requested version of code.

6. The method according to claim 1, wherein modifying, by the first computer, a first default version of the web page further comprises modifying, by the first computer, the link included in the first default version of the web page to link to the version of the embedded code of the plurality of versions of the embedded code that matches the requested specific version of the embedded code.

7. A computer program product for on-demand code version switching, the computer program product comprising one or more computer readable storage medium and program instructions stored on at least one of the one or more computer readable storage medium, wherein the one or more computer readable storage medium does not include a transitory signal per se, the program instructions comprising:
    program instructions to receive, by a first computer, a request from a second computer for a web page that contains embedded code, wherein the first computer includes a plurality of versions of the embedded code;
    in response to program instructions to determine, by the first computer, that the web page request includes a request for a specific version of the embedded code:
    program instructions to modify, by the first computer, a first default version of the web page to include a version of the embedded code of the plurality of versions of the embedded code that matches the requested specific version of the embedded code, wherein the first default version of the web page includes a link to the version of the embedded code of the plurality of versions of the embedded code that matches the requested specific version of the embedded code; and
    program instructions to transmit, by the first computer, the modified first default version of the web page to the second computer.

8. The computer program product according to claim 7, further comprising:
    in response to program instructions to determine, by the first computer, that the web page request does not include a request for a specific version of the embedded code,
    program instructions to transmit, by the first computer, a default version of the web page that contains a default version of the embedded code to the second computer.

9. The computer program product according to claim 7, wherein the plurality of versions of the embedded code comprise at least one of:
    a production version,
    a debug version, and
    a source version.

10. The computer program product according to claim 7, wherein the request received is a uniform resource locator (URL).

11. The computer program product according to claim 10, wherein the URL includes a query parameter to identify the requested version of code.

12. The computer program product according to claim 7, wherein program instructions to modify, by the first computer, a first default version of the web page further comprise program instructions to modify, by the first computer, the link included in the first default version of the web page to link to the version of the embedded code of the plurality of versions of the embedded code that matches the requested specific version of the embedded code.

13. A computer system for on-demand code version switching, the computer system comprising one or more processors, one or more computer readable memories, one or more computer readable storage medium, and program instructions stored on at least one of the one or more storage medium for execution by at least one of the one or more processors via at least one of the one or more memories, the program instructions comprising:
- program instructions to receive, by a first computer, a request from a second computer for a web page that contains embedded code, wherein the first computer includes a plurality of versions of the embedded code;
- in response to program instructions to determine, by the first computer, that the web page request includes a request for a specific version of the embedded code:
- program instructions to modify, by the first computer, a first default version of the web page to include a version of the embedded code of the plurality of versions of the embedded code that matches the requested specific version of the embedded code, wherein the first default version of the web page includes a link to the version of the embedded code of the plurality of versions of the embedded code that matches the requested specific version of the embedded code; and
- program instructions to transmit, by the first computer, the modified first default version of the web page to the second computer.

14. The computer system according to claim 13, further comprising:
- in response to program instructions to determine, by the first computer, that the web page request does not include a request for a specific version of the embedded code,
- program instructions to transmit, by the first computer, a default version of the web page that contains a default version of the embedded code to the second computer.

15. The computer system according to claim 13, wherein the plurality of versions of the embedded code comprise at least one of:
- a production version,
- a debug version, and
- a source version.

16. The computer system according to claim 13, wherein the request received is a uniform resource locator (URL).

17. The computer system according to claim 16, wherein the URL includes a query parameter to identify the requested version of code.

* * * * *